United States Patent
Good et al.

(10) Patent No.: US 12,509,197 B2
(45) Date of Patent: Dec. 30, 2025

(54) RESCUE DRONE

(71) Applicants: Daniel J. Good, Tequesta, FL (US); Kevin Good, Tequesta, FL (US)

(72) Inventors: Daniel J. Good, Tequesta, FL (US); Kevin Good, Tequesta, FL (US)

(*) Notice: Subject to any disclaimer, the term of this patent is extended or adjusted under 35 U.S.C. 154(b) by 437 days.

(21) Appl. No.: 18/191,487

(22) Filed: Mar. 28, 2023

(65) Prior Publication Data

US 2024/0326965 A1    Oct. 3, 2024

(51) Int. Cl.
| | | |
|---|---|---|
| B63C 9/01 | (2006.01) | |
| B63C 9/08 | (2006.01) | |
| B63C 9/22 | (2006.01) | |
| B64C 39/02 | (2023.01) | |
| B64D 1/02 | (2006.01) | |
| B64D 1/22 | (2006.01) | |
| B64U 101/30 | (2023.01) | |
| B64U 101/57 | (2023.01) | |

(52) U.S. Cl.
CPC ............... *B63C 9/01* (2013.01); *B63C 9/082* (2013.01); *B63C 9/22* (2013.01); *B64C 39/024* (2013.01); *B64D 1/02* (2013.01); *B64D 1/22* (2013.01); *B64U 2101/30* (2023.01); *B64U 2101/57* (2023.01); *B64U 2201/20* (2023.01)

(58) Field of Classification Search
CPC .. B63C 9/01; B63C 9/082; B63C 9/08; B63C 9/22; B64C 39/022; B64C 39/024; B64U 2101/57
See application file for complete search history.

(56) References Cited

U.S. PATENT DOCUMENTS

| | | |
|---|---|---|
| 2,160,175 A | 5/1939 | Shakespeare, Jr. |
| 7,130,741 B2 | 10/2006 | Bodin et al. |
| 7,344,426 B1 | 3/2008 | Dysthe |
| 7,546,187 B2 | 6/2009 | Bodin et al. |
| 7,755,496 B1 | 7/2010 | Bernstein |
| 8,646,719 B2 | 2/2014 | Morris et al. |
| 8,869,671 B2 | 10/2014 | Williamson et al. |
| 8,882,555 B2 | 11/2014 | Mulligan et al. |
| 9,745,062 B2* | 8/2017 | Richardson ............ B64U 10/13 |
| 9,944,366 B2* | 4/2018 | Tang ........................ B63C 9/01 |
| 10,059,448 B1 | 8/2018 | Shoemaker, Jr. |
| 10,377,455 B2 | 8/2019 | Oh |
| 10,668,997 B2 | 6/2020 | Moses et al. |
| 11,136,096 B2 | 10/2021 | Moses et al. |
| 2006/0237565 A1 | 10/2006 | Barker |
| 2019/0046816 A1 | 2/2019 | Browning et al. |
| 2020/0031438 A1 | 1/2020 | Moses et al. |

* cited by examiner

*Primary Examiner* — Michael L Sehn
(74) *Attorney, Agent, or Firm* — McHale & Slavin, P.A.

(57) ABSTRACT

A remote control drone assembly to assist in the rescue of distressed swimmers. The drone assembly includes a flotation device that can be released over a distressed swimmer. A retractable spool assembly attached to the drone assembly includes a line having a proximate end tethered to the spool assembly. The drone assembly is constructed and arranged to be flown by an operator over a distressed swimmer. The floatation device is released for use by the distressed swimmer and the drone assembly is returned to the operator. The retractable spool is detached from the drone assembly and attached to a spool retractor. The spool retractor retrieving the floatation device together with the distressed swimmer.

16 Claims, 13 Drawing Sheets

RESCUE DRONE

FIELD OF THE INVENTION

This invention is directed to the field of drones, also referred to as UAV and UAS (Unmanned Aerial Vehicle and Unmanned Aerial System) and, in particular, to a drone capable of releasing a floatation device for use in combination with a retriever mechanism to assist a swimmer in distress.

BACKGROUND OF THE INVENTION

The ability to rescue an individual that has fallen into a large body of water depends on a number of variables. For example, recovering an individual that falls off a large cruise ship can be problematic as it can take upwards of one mile to stop or turn a cruise ship around. In the period of time it takes to stop or turn around a cruise ship, the fallen individual may drift with the current making it difficult if not impossible to spot the individual from a mile away. If the individual is has no floatation device, or is a poor swimmer, the period of time for a successful rescue may be minutes. The problem with a man overboard is not limited to cruise ships; commercial boats can lose crew members on tankers, freighters, long line fishing boats and crab fishing boats and so forth. Even recreational vessels, such as a large sailboat, can have a man overboard situation wherein the vessel is difficult to stop and return to the fallen individual.

The safety of individuals in the water is not limited to far offshore situations. An otherwise inviting beachfront visit can have life threatening consequences if an individual is caught in a rip current. Within minutes an individual can be drawn out away from the shoreline. In many such instances the individual is unprepared for such an event and can panic, risking exhaustion and drowning. If the individual is pulled into a rip current at a beach monitored by a lifeguard, the lifeguard will hopefully reach the swimmer in sufficient time but at a risk to the lifeguard.

Getting timely help to a man overboard is critical. High seas and icy cold water are but a few conditions that shorten the time for a successful rescue. The individual in need of rescue is often in a desperate position posing a danger to potential rescuers. Additionally, an individual in need of rescue may be a significant distance away from the rescuer or be in a situation where an attempted rescue puts additional individuals at risk.

U.S. Coast Guard has a mission, known as Search and Rescue (SAR), to minimize the loss of life, injury and property damage by rendering aid to persons in distress. Despite the use of advanced equipment including airplanes and boats linked by specialty communication networks, there are many instances where an attempted rescue becomes too great of a risk for even the highly trained servicemen. For instance, if the seas are rough, filled with debris or ice cold, a rescue attempt will put the rescuer at great risk. Even with advanced military training, an individual is still susceptible to injury while performing their duties. In instances where a helicopter is used, the propeller wash can place all those aboard the helicopter at risk. A number of prior art references directed to the rescue devices exist.

U.S. Pat. No. 7,546,187 discloses a method for navigating a drone having an on-board digital camera. Embodiments include identifying a geographic area not captured by the digital camera while the drone is flying.

U.S. Pat. No. 7,130,741 discloses a remote control with a user's selection of a graphical user interface (GUI) map pixel that represents a waypoint for UAV navigation, the pixel having a location on the GUI; mapping the pixel's location on the GUI to Earth coordinates of the waypoint; receiving a starting position from a GPS receiver on the UAV; calculating a heading in dependence upon the starting position, the coordinates of the waypoint, and a navigation algorithm; identifying flight control instructions for flying the UAV on the heading; and transmitting the flight control instructions from the remote control device to the UAV.

U.S. Pat. No. 7,755,496 discloses a system for directing a lost person to a predetermined location for pickup including a tethered balloon or other highly visible signal deployed at the pickup location. A manned or remotely controlled aircraft is provided for flying over the area in which the lost person is presumed to be located. The aircraft is equipped with a downward directed loudspeaker broadcasting an audible message instructing the lost person to walk towards the balloon or other signal at the rescue location. The aircraft may be a fixed-wing or rotary-wing aircraft, and airship such as a dirigible or blimp, an ultralight, or a hybrid aircraft.

U.S. Pat. No. 8,882,555 discloses a remote controlled motorized buoy for rescuing people in the water. The buoy may be controlled by a person with a remote control to navigate to the person in need. The buoy may have flotation mechanisms to keep the buoy right side up in rough water conditions and includes visual indicators to help the user keep track of the buoys location, such as a flag and beacon. When the buoy is near the swimmer, the swimmer may grab the buoy and the buoy may be remotely navigated to bring the swimmer to a safe location.

U.S. Pat. No. 8,646,719 discloses an unmanned, towable air vehicle is described and includes electronic sensors to increase the detection range relative to the horizon detection limitations of a surface craft, an autogyro assembly to provide lift, and a controller to control operation the autogyro assembly for unmanned flight. A forward motive force powers the autogyro assembly to provide lift. In an example, the autogyro assembly includes a mast extending from the container, a rotatable hub on an end of the mast, and a plurality of blades connected to the hub for rotation to provide lift to the vehicle. In an example, an electrical motor rotates the blades prior to lift off to assist in take off. The electrical motor does not have enough power to sustain flight of the vehicle in an example.

U.S. Pat. No. 8,869,671 discloses a spring-driven linkage for deploying one or more kicker feet, to push a device to be deployed away from a UAV deployment system. The kicker feet may include fore and aft kicker feet that push the deployed device to obtain a desire pitch in the launch, an example being a minimal or substantially zero pitch. The release of the kicker feet may be controlled by a pair of actuator, such as electrical solenoid actuators, both of which must be actuated to deploy the device. An electrical connection may allow positional float to account for tolerances in the positioning of the device relative to the deployment system.

U.S. Pat. No. 7,344,426 discloses a rescue system which includes a mobile trailer on which are mounted telescoping hydraulic arms and a winch. A net is connected to the winch and passes over a roller mounted at the outer ends of the hydraulic arms which are vertically and horizontally movable to position the net over the body of water. The net hangs downwardly from the roller into the body of water. A ballast is attached at the lower end of the net so that the net is vertically oriented in the water. A rope connected to the lower end of the net and a set of pulleys enable the lower end of the net to be lifted to envelope a person therein. When the person is enveloped in the net, the winch is actuated via an electric motor to reel in the net and lift the net and the person out of the body of water and to a place of safety.

U.S. Pat. No. 10,059,448 discloses a rescue device based upon a drone equipped with a deployable life preserver or other buoyant device. The drone used a vacuum pump connected to a suction cup for holding of a buoyant floatation member.

U.S. Publication 2020/0031438 discloses a rescue drone system that includes a buoyant body member, a frame attached to the buoyant body member for carrying a motor, propeller, and electronic array. A laser guidance system may provide coordinates for landing near a swimmer in distress. In one embodiment the drone system can take off and land vertically with propellers rotating in a horizontal plane, and propellers can pivot to rotate in a vertical plane for propulsion across water similar to a fan boat with rescued people aboard.

What is needed in the art is an improved method for rescuing an individual at sea without placing the rescuer at risk, or otherwise adding to the hazardous conditions. Various attempts have been made to accomplish remote rescues on land and on sea by use of a drone, each with various results.

SUMMARY OF THE INVENTION

Disclosed is a remote control drone assembly for use in assisting in distressed swimmers and the like individuals stranded in water in need of rescue. The drone assembly having a plurality of rotor assemblies and a power source secured to a frame member, including a wireless controller for operational control of the drone assembly. A frame mounted camera transfers images for viewing on a screen coupled to the wireless controller. A retractable spool assembly is releasably attached to the frame member. The retractable spool assembly including a 300 lb line having a length of at least ½ mile and preferably at least 1 mile long. One end of the line is tethered to the spool assembly, the distal end of the line is secured to a floatation device. The flotation device is secured to the frame assembly by a release bracket which can deploy the flotation device by operation of the wireless controller.

The drone assembly can be flown by operating the wireless controller to a position over a distressed swimmer and activated to release the floatation device for use by a distressed swimmer. The drone assembly is flown back to the operator of the controller deploying a length of line from the spool to accommodate the distance between the spool and the floatation device. The spool assembly is then detached from the drone assembly and coupled to a retractor. The retractor being a battery power motor capable of retrieving the floatation device and the distressed swimmer.

An objective of the instant invention is to provide a drone assembly capable of flying a floatation device to a distressed swimmer or the like individual in need of rescue, and returning the drone assembly to the drone operator wherein a spool retractor allows retrieval of the floatation device and distressed swimmer.

Still another objective of the invention is to provide a drone assembly having a tether line preferably about one mile long and evenly spooled by a level wind device operated by a spool retractor.

Yet still another objective of the invention is to provide a rescue apparatus that can operated like a conventional drone with the advantage of returning a line from a deployed floatation device assembly for coupling to a spool retractor capable of retrieving the floatation device and distress swimmer.

Still another objective of the invention is to teach the use a variable speed driver for a retractor, the driver constructed and arranged to receive the spool assembly and retrieve line at the operator's discretion. For instance, high speed retraction if the operator is headed to the distressed swimmer in a boat. Low speed retraction or even further deployment if the operator is on a cruise vessel that has yet to reverse course.

Other objectives and further advantages and benefits associated with this invention will be apparent to those skilled in the art from the description, examples and claims which follow.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the Figures, disclosed is a remote control drone assembly for assisting distressed swimmers and the like water rescues. The drone assembly 10 includes a flotation device 12 that can be released over a distressed swimmer tethered by a line 14 to a releasably attached spool 16. The drone assembly 10 is operated by a wireless controller 18 for deploying and retrieving the drone assembly 10. A handheld retriever 20 accepts the spool 16 and allows the operator to retrieve the tethered flotation device 12.

The drone assembly 10 consists of a frame member 30 having a plurality of rotor assemblies 32 and a power source 34 secured thereto. A camera 36 is attached to the frame member 30 with a modem 38 for transferring images for viewing on a screen 13 coupled to a wireless controller 18. The wireless controller 18 operating in a conventional format for controlling the elevation, direction and forward speed of the drone assembly 10. The camera 36 provides remote viewing to assist in locating the distressed swimmer. The camera 36 may be conventional using lights for night time illumination and/or forward looking infrared (FLIR). In one embodiment the FLIR provides thermal infrared imaging sensors to detect swimmers regardless of the light. Remotely activated lights 37, 39 can be used to illuminate the rescue/landing zone wherein the swimmer can locate the floatation device in the darkness.

The drone assembly 10 includes a spool assembly 16 releasably attached to the frame 30 member by use of a release bracket 40. The release bracket 40 having a solenoid-operated latch 42 which maintains the floatation device 12 in a position secured to the frame 30 while in a storage position, and upon activation of the solenoid-operated latch 42 the floatation device 12 is deployed. When the floatation device 12 is in a storage position, the drone assembly 10 can land on the water. If the floatation device 12 is deployed first pontoons 41 are supported by a first stand 45, and second pontoons 43 are support by a second stand 47. The pontoons operate as landing gear on water wherein the pontoons are constructed and arranged to provide sufficient floatation for the drone 10, alternatively the pontoons operate as a base for landing on solid surfaces.

Figure 1:
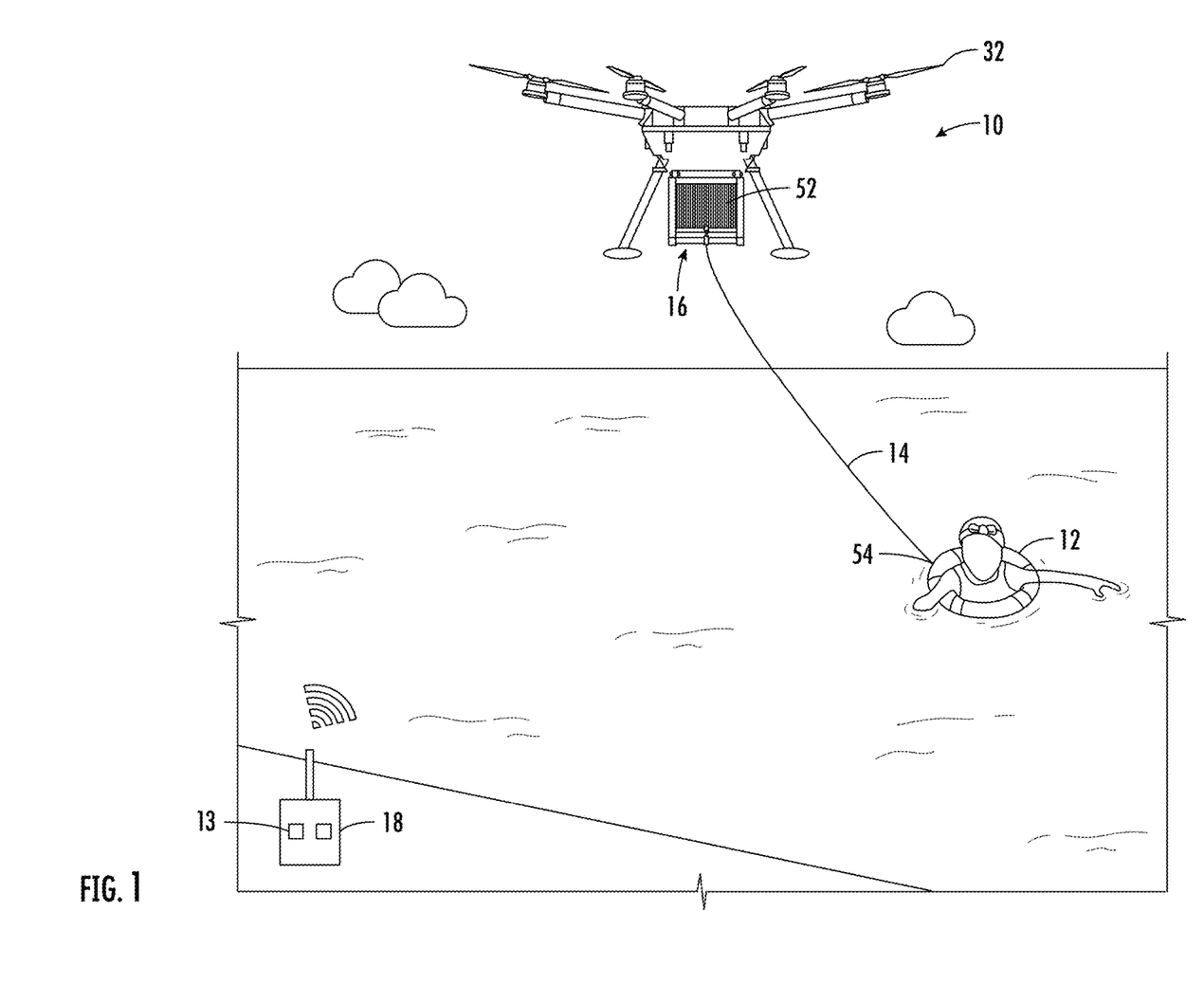
FIG. 1 is a pictorial view of the device with a distressed swimmer.
Figure 2:
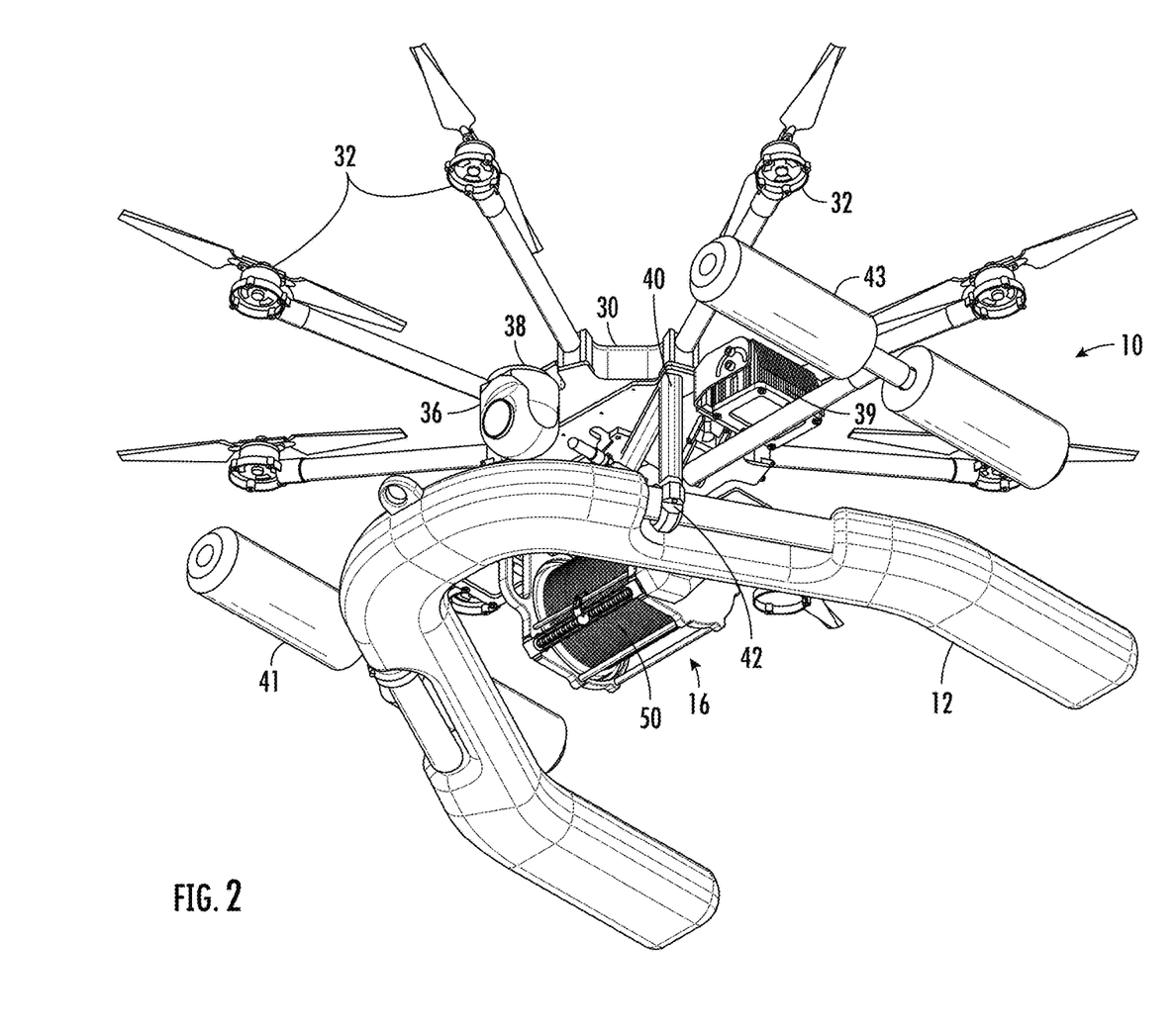
FIG. 2 is a lower perspective view of the rescue drone system.
Figure 3:
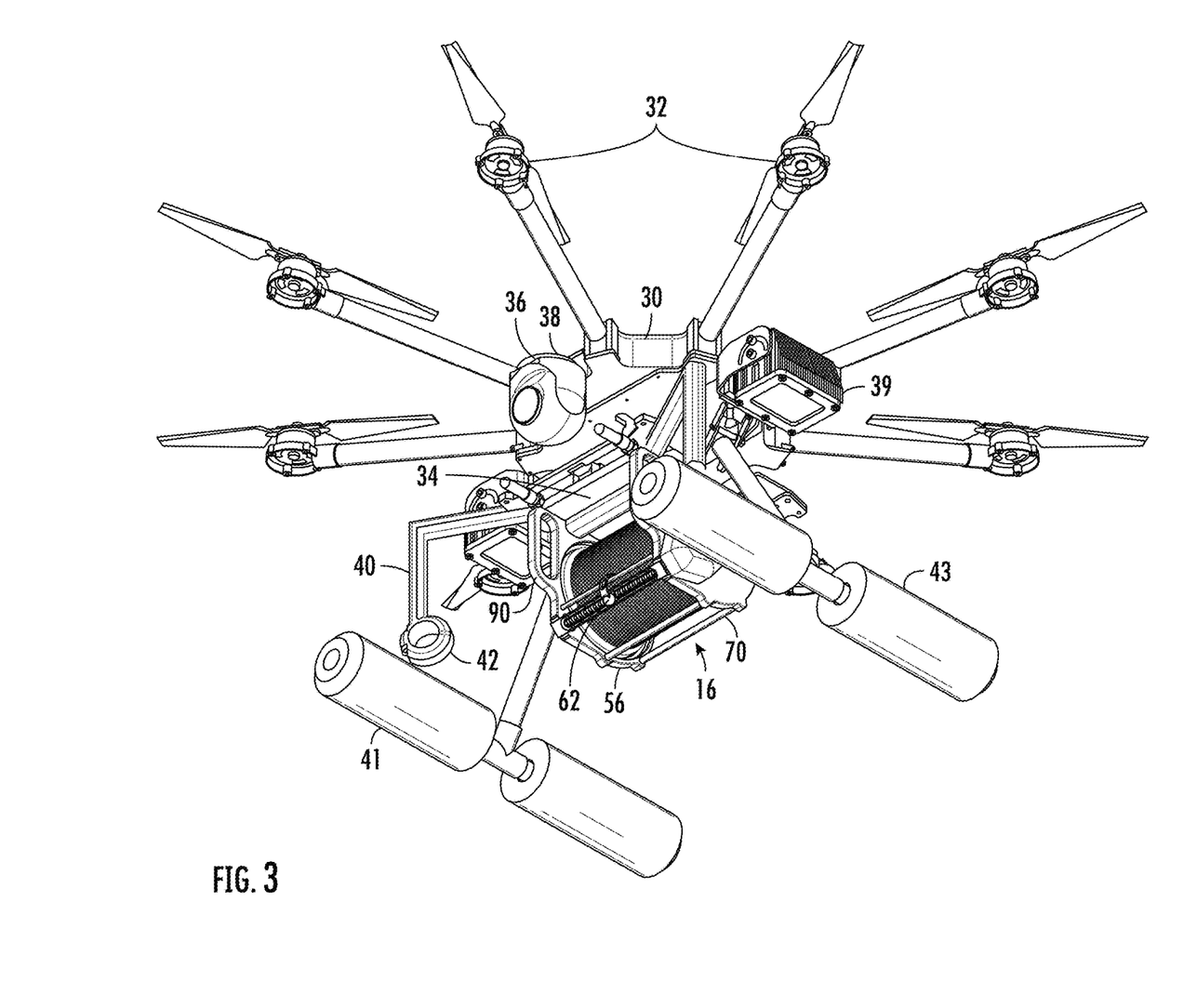
FIG. 3 is a lower perspective view without a floatation element.
Figure 4:
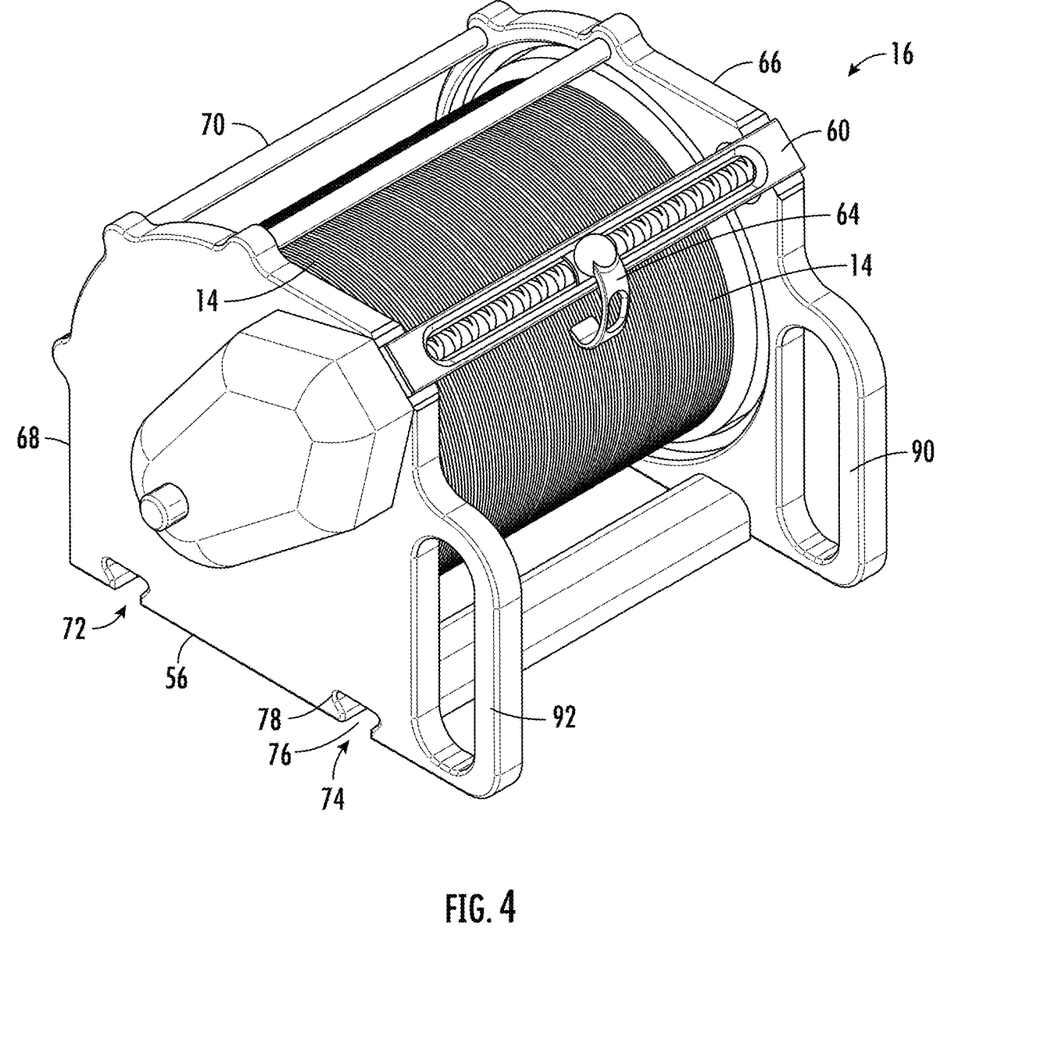
FIG. 4 is a left front perspective view of the spool.
Figure 5:
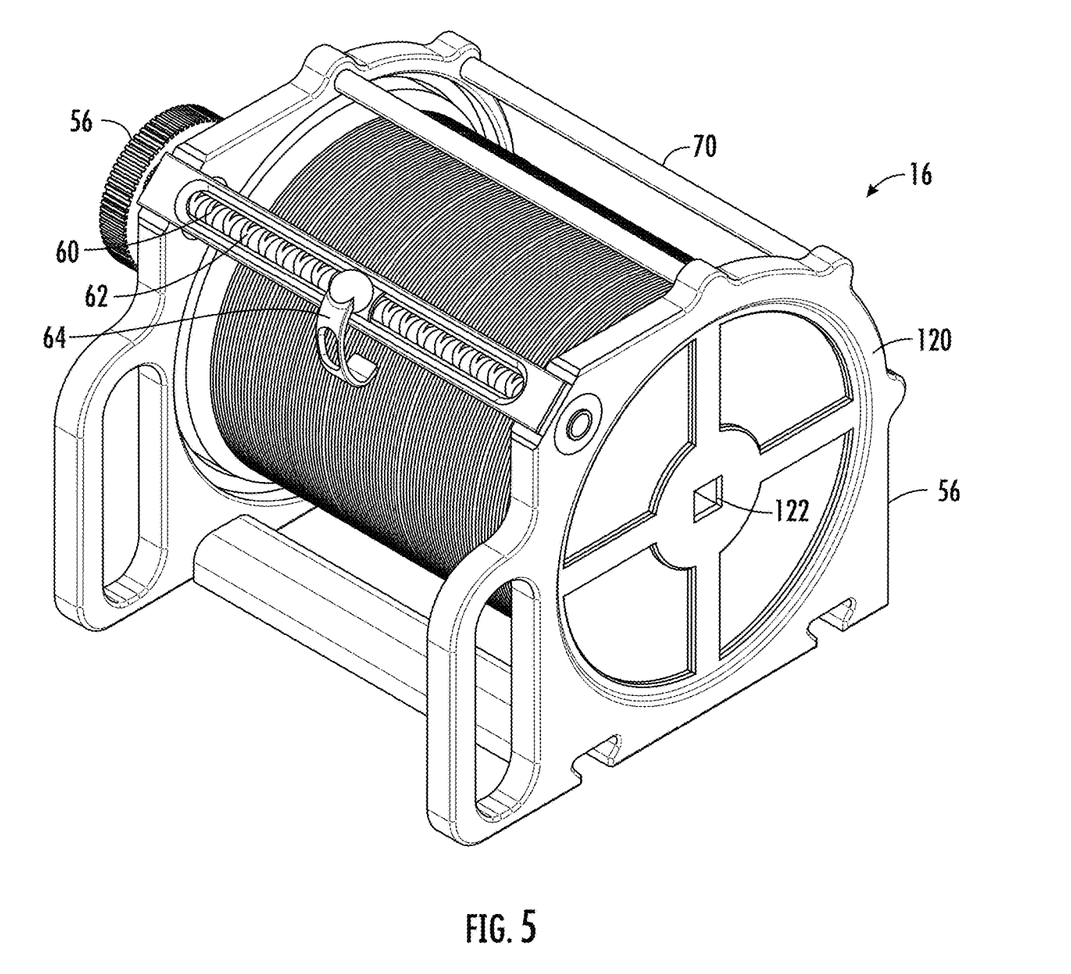
FIG. 5 is a right front perspective of the spool.
Figure 6:
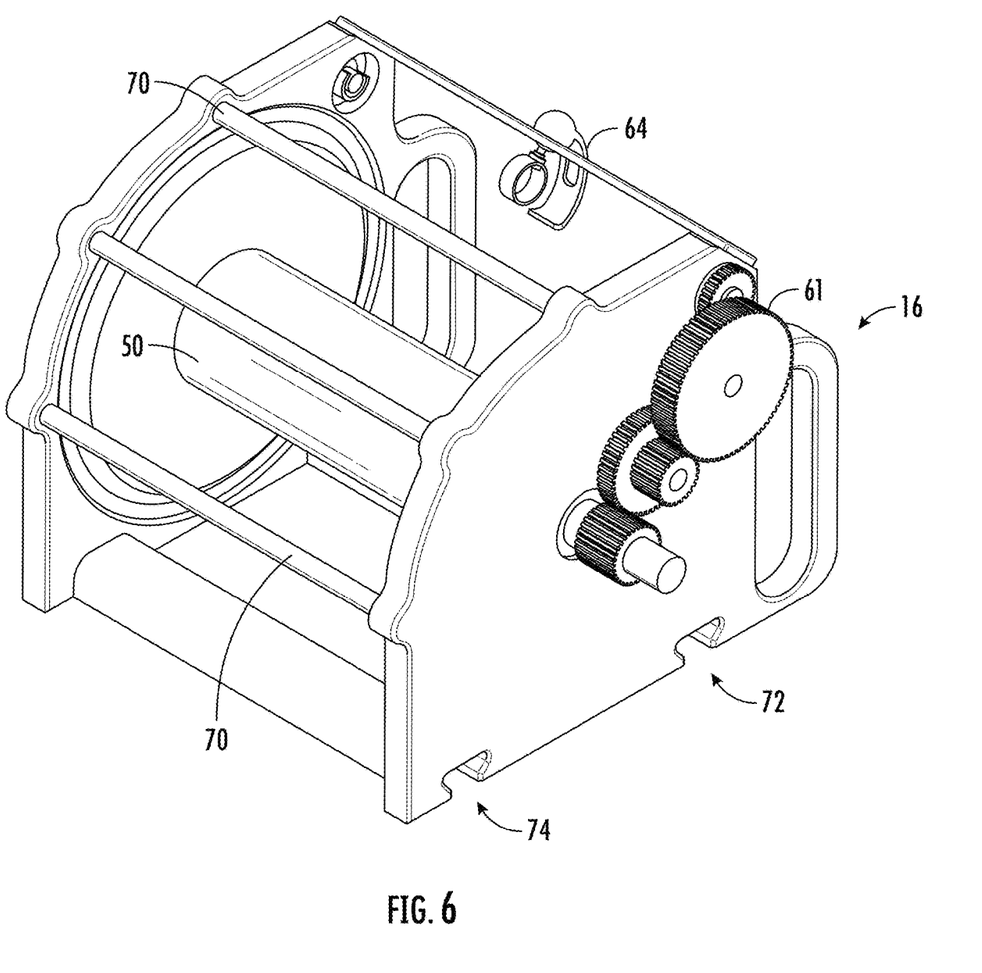
FIG. 6 is a right rear perspective view of the spool.

The spool assembly 16 includes a line 50 having a proximate end 52 and a distal end 54, the proximate end 52 is tethered to a line spool 50 attached to a spool frame housing 56. The line spool 50 includes a gear assembly 61 engaging a level winder 60 having a helix gear 62 for transverse movement of a line pawl 64. The line pawl 64 moveable along the width of the line spool 50 to allow an organized collection of the line 14 during retrieval. The spool frame housing 56 having a first side wall 66 separated by a second side wall 68 by use of a plurality of frame support rods 70. Along the bottom of the first 66 and second side wall 68 is an inner track mounting guide 72 and an outer track mounting guide 74. In one embodiment the mounting guides 72, 74 form a receptacle with each having an opening 76 leading to an expanded sidewall 78. The opening 76 and expanded sidewall 78 of each said mounting guide 72, 74 are slidably attached to reciprocal protrusions 80, 82 extending from the bottom of the frame 30. The protrusion having a head portion 84 that fits within the expanded sidewall 78 and a neck portion 86 that fits within the opening 76. The side walls 66, 68 having integrated lifting handles 90, 92 for ease of attachment and removal from either the frame 30.

Figure 7:
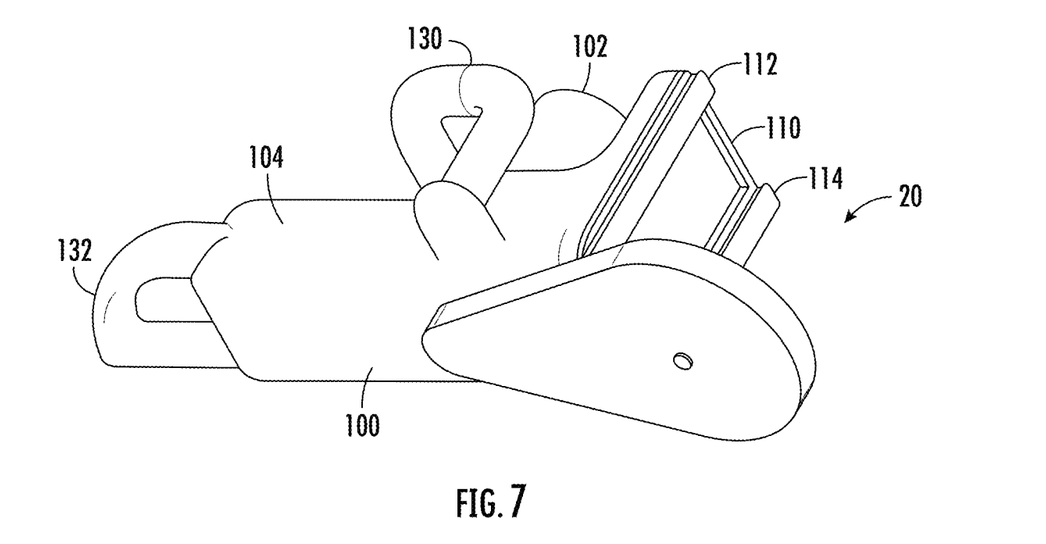
FIG. 7 is a top right perspective view of the hand held retriever.
Figure 8:
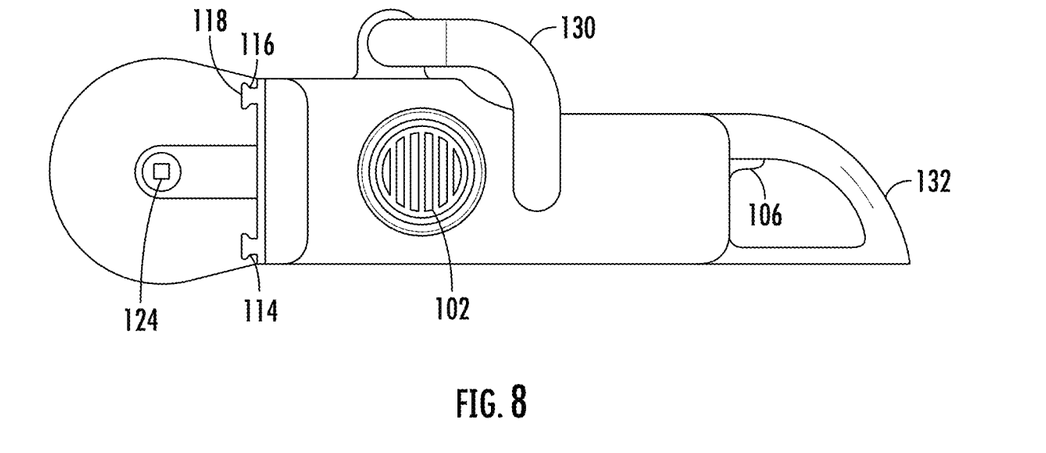
FIG. 8 is a right plane view of the hand held retriever.
Figure 9:
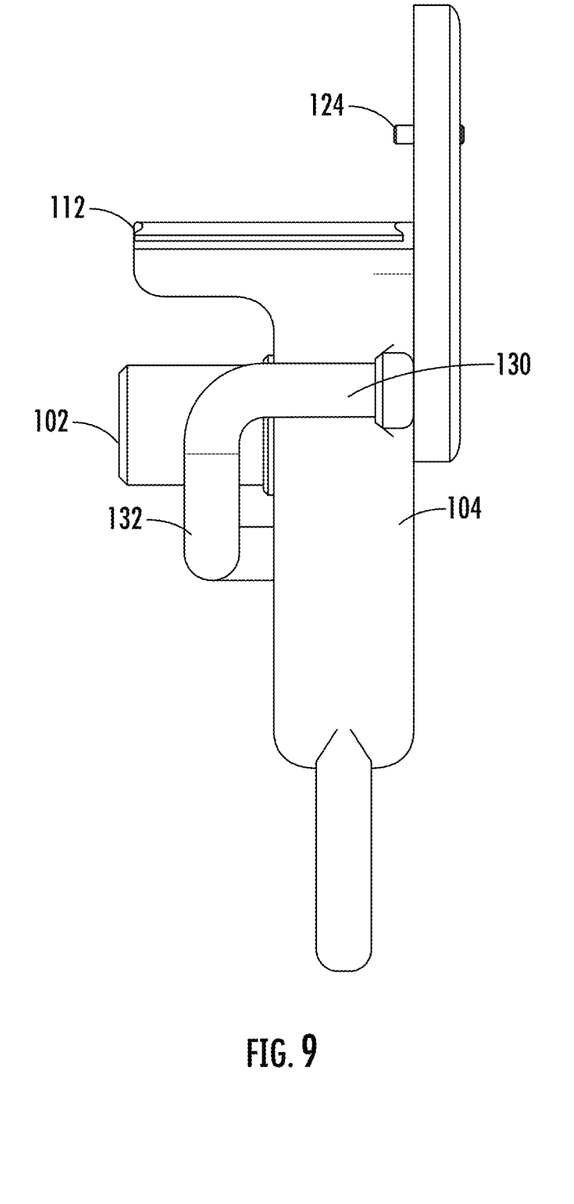
FIG. 9 is a top plane view of the hand held retriever.

The spool retractor 20 has a frame 100 with a variable speed drive motor 102 electrically coupled to a rechargeable battery 104. The speed of the motor 102 can be varied by depressing of a control switch 106. The greater the depression of the switch 106, the greater the rotational speed of the drive motor 102. The frame 100 includes a bracket 110 for receipt of the retractable spool assembly 16 namely an upper protrusion 112 and a lower protrusion 114. Each protrusion is similar to the drone assembly protrusions having a neck portion 116 and a head portion 118. The protrusions 112, 114 are constructed and arranged to engage the retractable spool assembly 16 mounting guides 72, 74. It should be noted that the engagement mechanism can be reversed, namely the receptacles can be formed on the retractor 20 and drone assembly 10 with the protrusions on the spool assembly 16.

A first end 120 of the spool assembly 16 has a drive socket 122 coupled to a driver 124 rotated by the drive motor 102.

The line 14 can be withdrawn by wrapping around the spool 50 when the drive motor 102 is operated. The line spool 50 engages the level winder 60 having a helix gear 62 for transverse movement of the line pawl 64. The line pawl 64 moveable along the width of the line spool 50 to allow an organized collection of the line 14 during retrieval. Spool frame housing 56 having a first side wall 66 separated by a second side wall 68 by use of a plurality of frame support rods 70. Tension on the spool 50 is used to prevent free wheeling which can cause line entanglement or lead to a birds nest. The frame includes a forward hand grip 130 and an aft hand grip 132.

Figure 10:
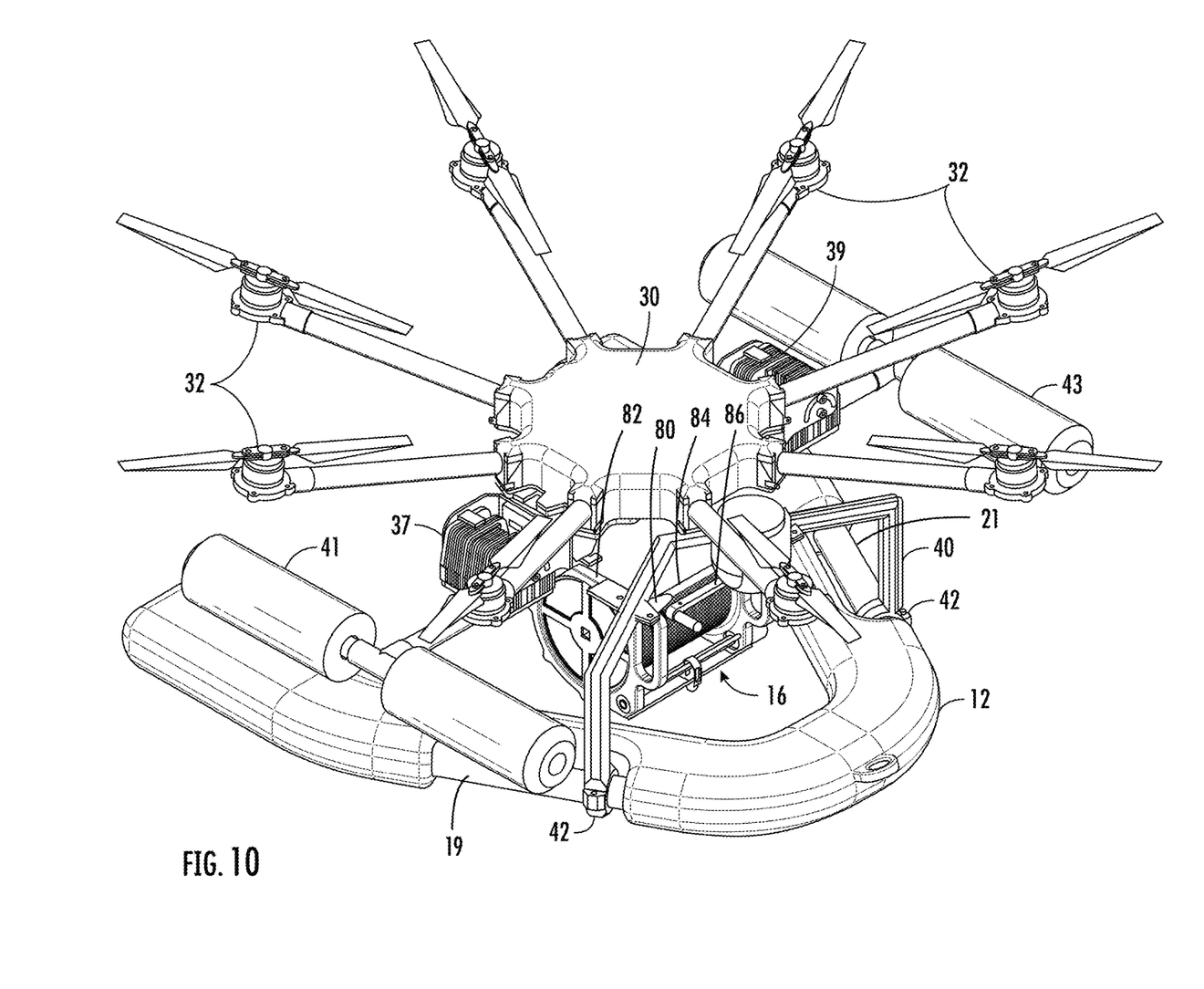
FIG. 10 is an upper perspective view of the rescue drone system.
Figure 11:
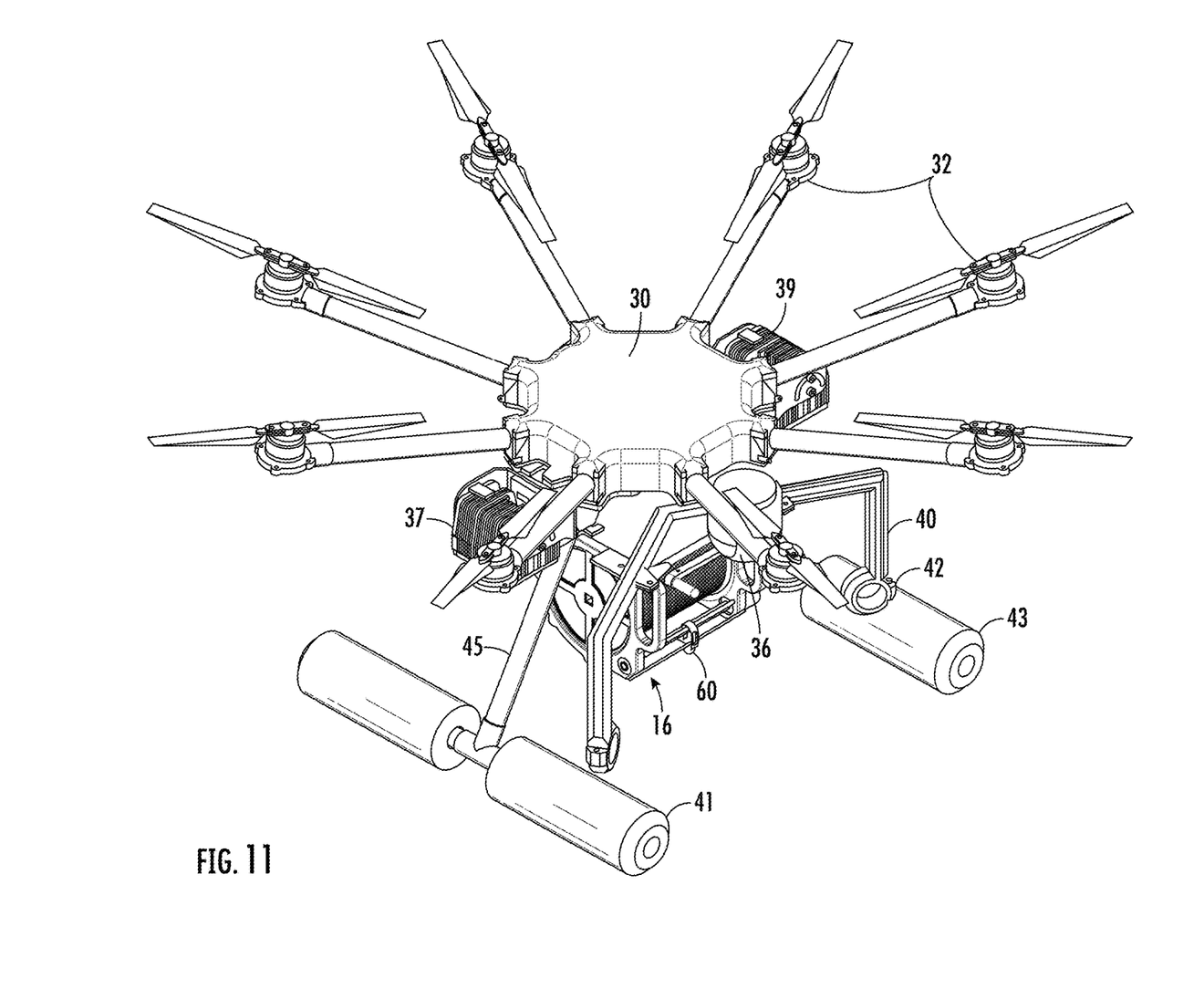
FIG. 11 is an upper left perspective view of the rescue drone system without the floatation element.
Figure 12:
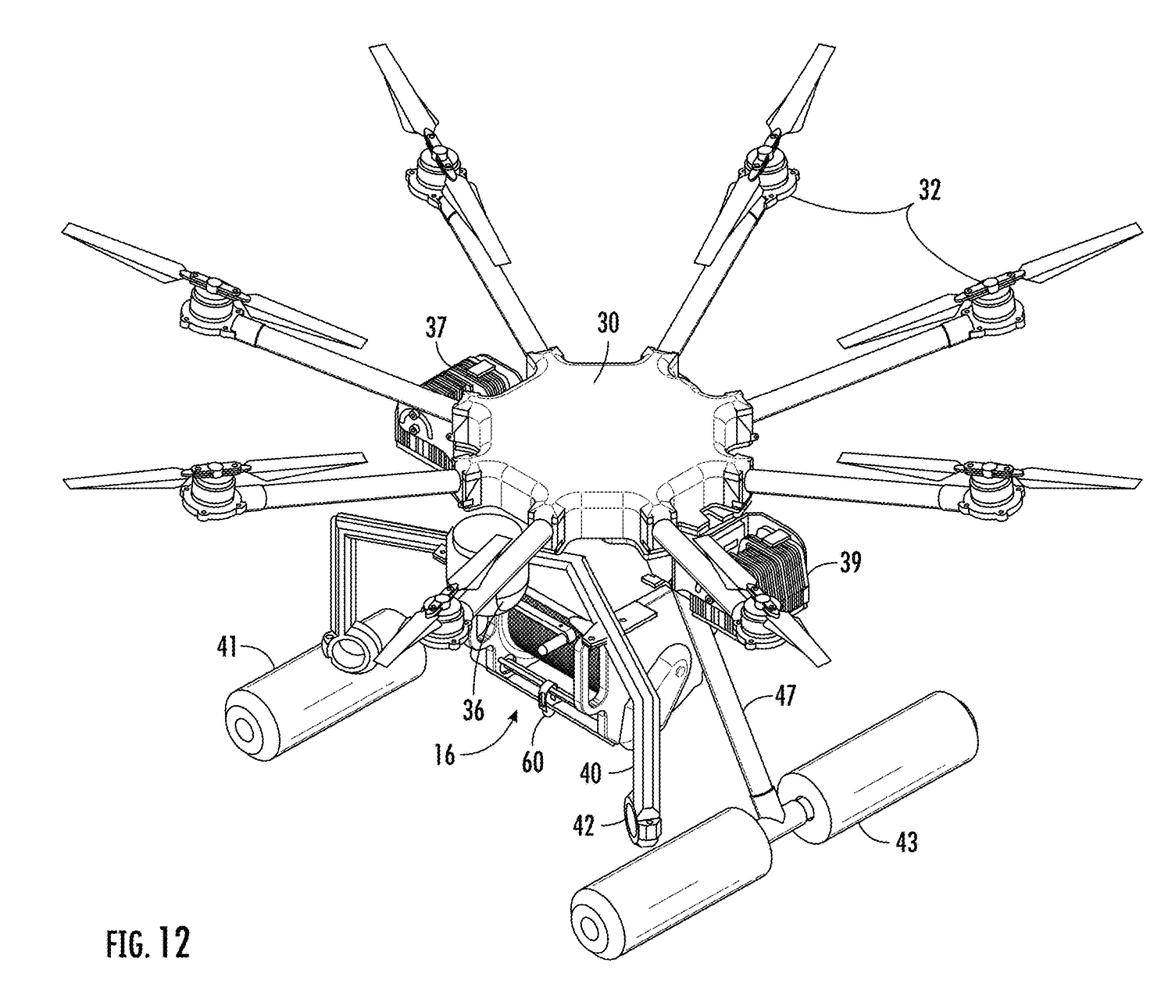
FIG. 12 is an upper right perspective view of the rescue drone system without the floatation element.

FIGS. 10-12 depict the rescue drone assembly 10 with the floatation device 12 tethered by a line 14 to the releasably attached spool assembly 16. An end of the line 14 is attached to a coupling point 17 of the floatation device 12. The floatation device 12 includes bars 19, 21 to provide a gripping surface for the individual in need of recovery. The floatation device 12 may be constructed of foam, hollow plastic, or be formed of an inflatable bladder with the intent of providing a lightweight floatation device. It is note that the floatation device requires sufficient weight and shape so as limit the effect of wind on the device when released from the assembly. The drone assembly 10 is based upon a frame member 30 supported by a plurality of rotor assemblies 32. In a preferred embodiment, eight rotor assemblies 32 are equally spaced apart, the rotor assemblies are constructed and arranged to support the weight of the assembly including floatation device 12 and releasable spool 16 via an electric motor 15. The camera 36 is positioned on the front of the frame 30 to provide remote viewing of the floatation device 12 to allow remote deployment.

Figure 13:
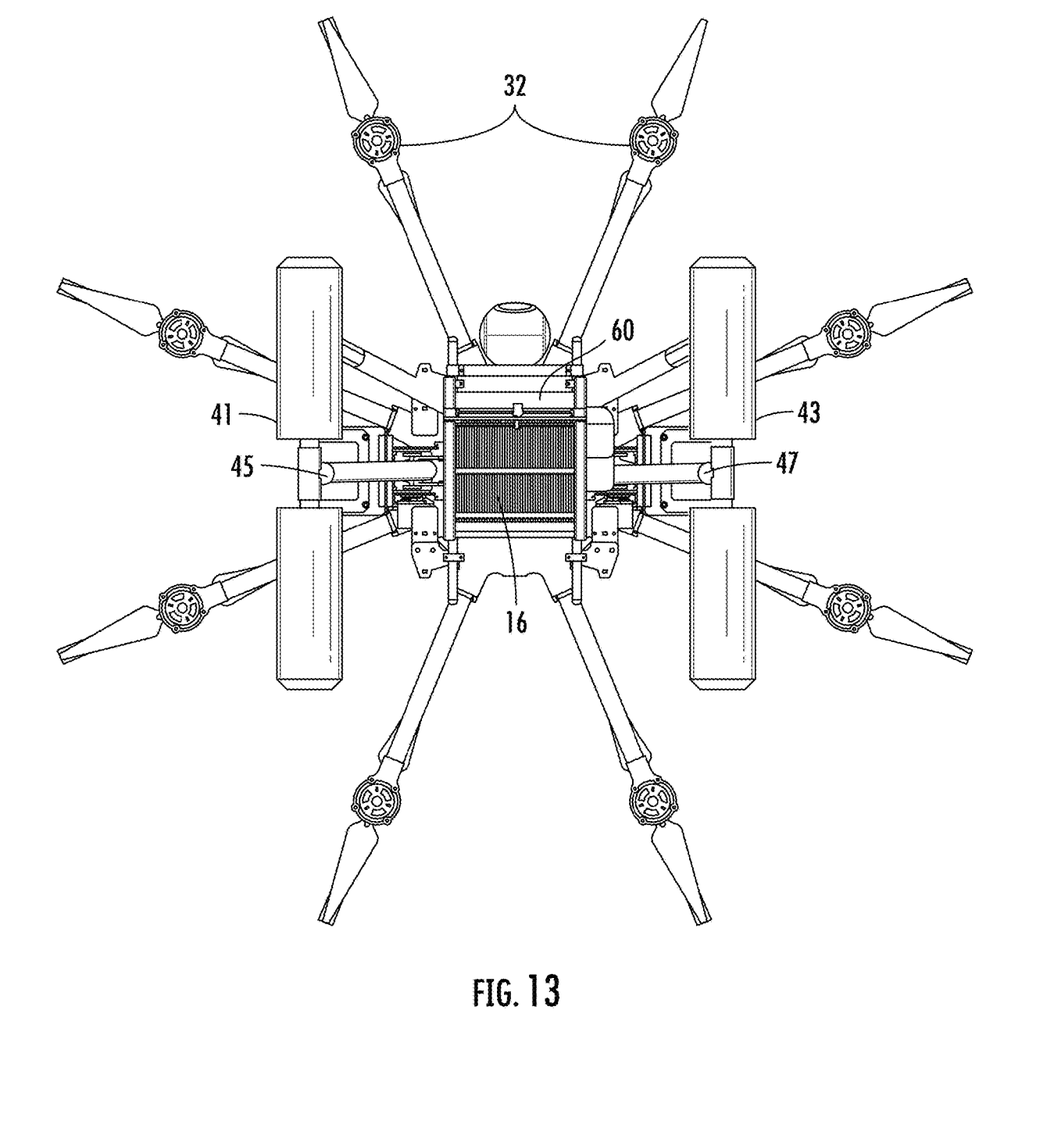
FIG. 13 is an bottom plane view of the rescue drone system without the floatation element.
Figure 14:
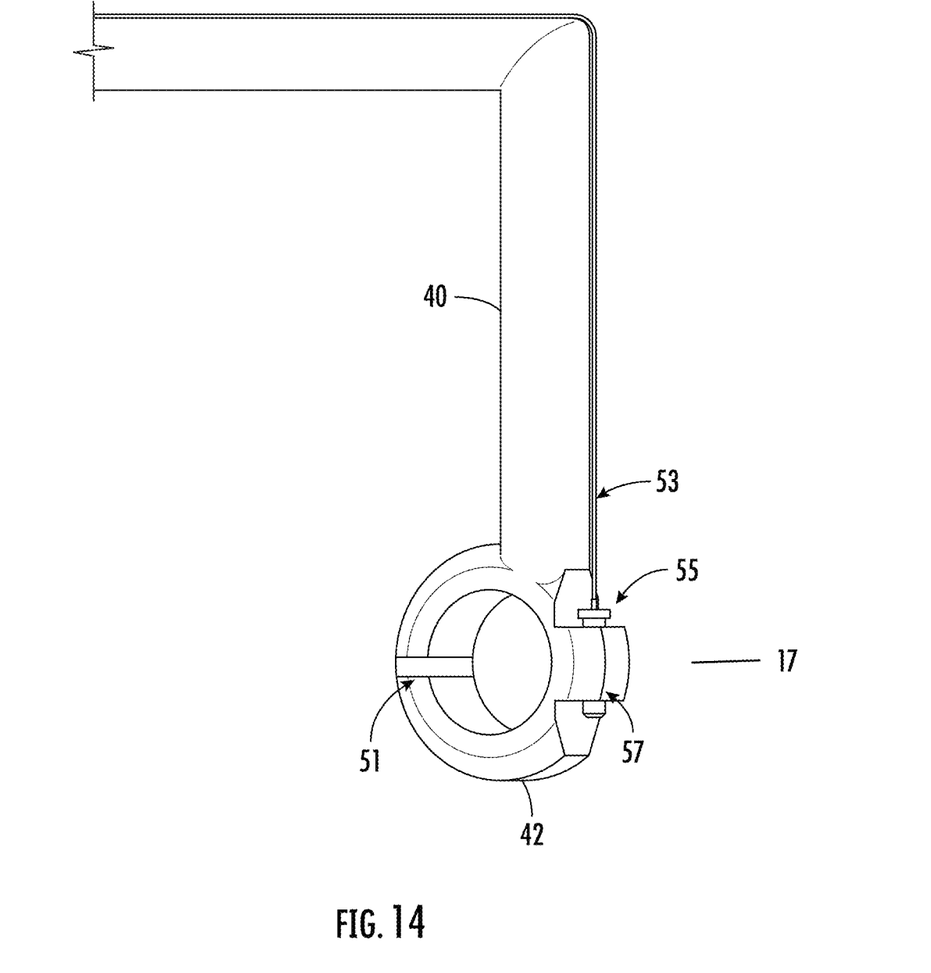
FIG. 14 is a plane view of the floatation element support arm.

The retractable spool 16 is releasably attached to the frame 30 member by use of a release bracket 40. The release bracket 40 having a solenoid operated latch 42 which maintains the floatation device 12 in a position secured to the frame 30 while in a storage position, and upon activation of the solenoid 42, the floatation device 12 is deployed by opening of a claw 51 by pulling a wire 53 to lift a pin 55 allowing rotation on a hinge 57. When the arms 43 are opened the floatation device 12 is released from the assembly and the line 14 will begin to spool out as the drone assembly 10 is returned to the drone operator.

In operation, the drone assembly can be flown by operating the wireless controller to a position over a distressed swimmer. The wireless controller can then be used to activate the solenoid used to deploy the floatation device from the release bracket. The drone assembly is then returned to the wireless controller operator wherein line is deployed from the spool to accommodate the distance between the retractable spool and the floatation device. Once the drone assembly is returned to the operator, the retractable spool assembly is detached from the frame member and attached to the spool retractor. The spool retractor is then used in retrieving the floatation device together with the distressed swimmer.

The line length deployed is dependent on the use. For lifeguard use, a length of about ¼ mile is suitable. For cruise ship applications, a line length of about 1 mile is preferred. The longer length of line necessary to accommodate the distance traveled by the cruise ship once the crew is notified of the man overboard. In the preferred embodiment, the line has about a 300 lb test strength and floats. A brightly colored or fluorescent floating line is easier to detect in daylight. For instance, if the floatation device was deployed but the spool ran out of line before the vessel was turned around, a smaller rescue boat can perform a zig-zag pattern to locate the line and, once found, and follow the line to the floatation device. In the preferred embodiment the floatation device is substantially U-shaped, however, traditional round or oblong shape is equally suitable.

A communication device can also be used to provide 2-way audio communication between the swimmer in distress and the operator of the drone. When time is of the essence, the drone assembly will dramatically reduce the amount of time necessary in rescue missions. In many situations a distressed swimmer is at risk and a first responder would further be placed in position of risk during a rescue attempt.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A rescue drone system comprising:
   a drone assembly formed from a frame member having a plurality of rotor assemblies and a power source secured thereto and controlled by a wireless controller;
   a spool assembly releasably attached to said frame member, said spool assembly including a line having a proximate end and a distal end, said proximate end tethered to said spool assembly;
   a release bracket secured to said frame member and controlled from a storage position to a deployed position by operation of said wireless controller;
   a floatation device releasably secured to said release bracket and said distal end of said line; and
   a spool retractor constructed and arranged to receive said spool assembly, said spool retractor having a rechargeable battery coupled to a motor driver;
   wherein said drone assembly is operated by said wireless controller to a position over a distressed swimmer and activated to release said floatation device from said release bracket whereby said drone assembly is returned to said wireless controller while deploying line from said spool to accommodate the distance between the spool assembly and the floatation device, wherein said spool assembly is detached from said frame member and attached to said spool retractor, said spool retractor retrieving said floatation device.

2. The rescue drone system according to claim 1 wherein said line is about one mile in length and constructed of a material that floats.

3. The rescue drone system according to claim 2 wherein said line is at least 300 lb test.

4. The rescue drone system according to claim 2 wherein said line is colored wherein the line can be detected during daylight.

5. The rescue drone system according to claim 1 wherein said spool assembly includes a level wind wherein line retracted is evenly wound around the spool assembly.

6. The rescue drone system according to claim 1 wherein said floatation device is substantially U-shaped.

7. The rescue drone system according to claim 1 wherein said floatation device is sized to provide floatation to said drone assembly on water.

8. The rescue drone system according to claim 1 wherein said spool assembly includes at least one receptacle that is releasably attached to a protrusion extending from said frame member.

9. The rescue drone system according to claim 8 wherein said spool assembly includes at least one receptacle that is releasably attached to a protrusion extending from said spool retractor.

10. The rescue drone system according to claim 1 including a camera with a modem attached to said frame member for transferring images to a screen coupled to said wireless controller.

11. The rescue drone system according to claim 10 wherein said camera includes a transceiver for audio.

12. A rescue drone system comprising:
    a drone assembly formed from a frame member having a plurality of rotor assemblies and a power source secured thereto and controlled by a wireless controller;
    a camera with a modem attached to said frame member for transferring images to a screen coupled to said wireless controller;
    a spool assembly having a level wind wherein floating line retracted is evenly wound around a spool, said spool assembly releasably attached to said frame member for holding said floating line having a length of about one mile and at least a 300 lb test rating, said floating line having a proximate end and a distal end, said proximate end tethered to said spool assembly;
    a release bracket secured to said frame member and controlled from a storage position to a deployed position by operation of said wireless controller;
    a floatation device releasably secured to said release bracket and said distal end of said floating line; and
    a spool retractor constructed and arranged to receive said spool assembly, said spool retractor having a rechargeable battery coupled to a motor driver;
    wherein said drone assembly is operated by said wireless controller to a position over a distressed swimmer and activated to release said floatation device from said release bracket whereby said drone assembly is returned to said wireless controller while deploying floating line from said spool to accommodate the distance between the spool assembly and the floatation device, wherein said spool assembly is detached from said frame member and attached to said spool retractor, said spool retractor retrieving said floatation device.

13. The rescue drone system according to claim 12 wherein said floatation device is substantially U-shaped.

14. The rescue drone system according to claim 12 wherein said camera includes a transceiver for audio.

15. The rescue drone system according to claim 12 wherein said spool assembly includes at least one receptacle that is releasably attached to a protrusion extending from said frame member.

16. The rescue drone system according to claim 15 wherein said spool assembly includes at least one receptacle that is releasably attached to a protrusion extending from said spool retractor.

* * * * *